Nov. 12, 1940.                J. C. PLASTARAS                2,220,946
                              KEYBOARD MECHANISM
                           Filed June 19, 1939            9 Sheets-Sheet 1
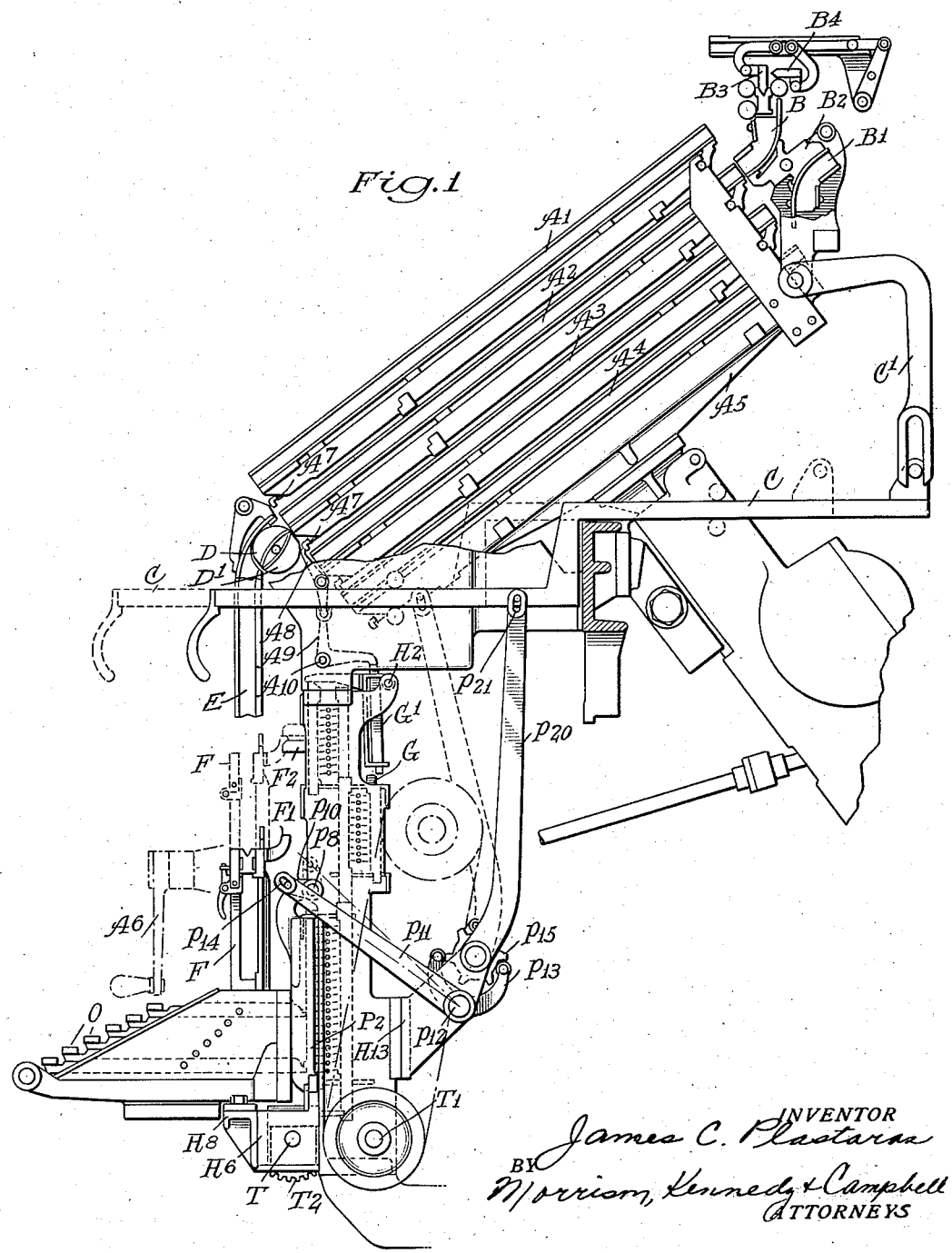

Nov. 12, 1940.  J. C. PLASTARAS  2,220,946
KEYBOARD MECHANISM
Filed June 19, 1939  9 Sheets-Sheet 2
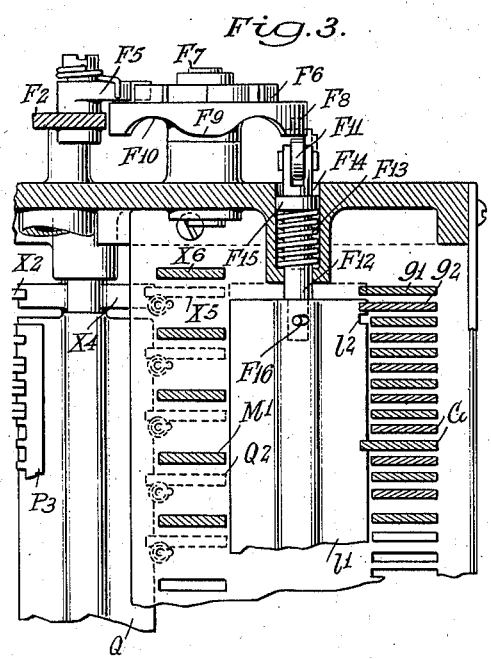
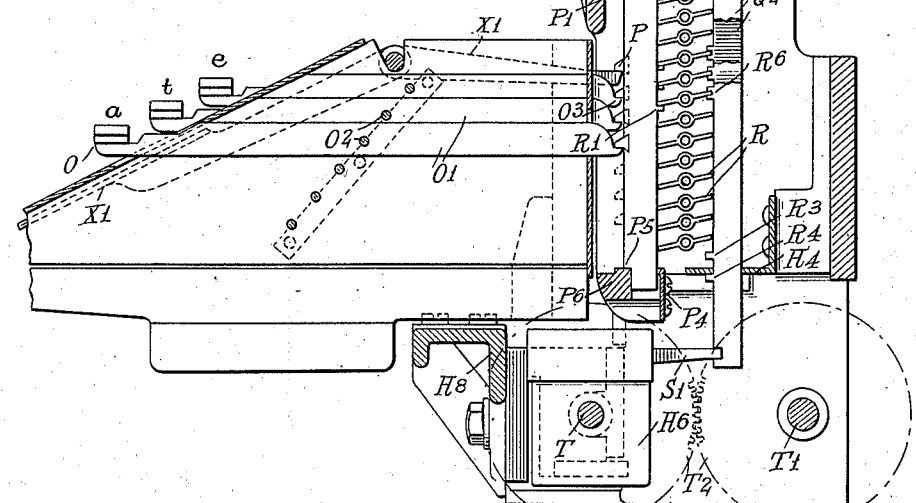
INVENTOR
James C. Plastaras
BY Morrison, Kennedy & Campbell
ATTORNEYS Nov. 12, 1940.　　　J. C. PLASTARAS　　　2,220,946
KEYBOARD MECHANISM
Filed June 19, 1939　　　9 Sheets-Sheet 3
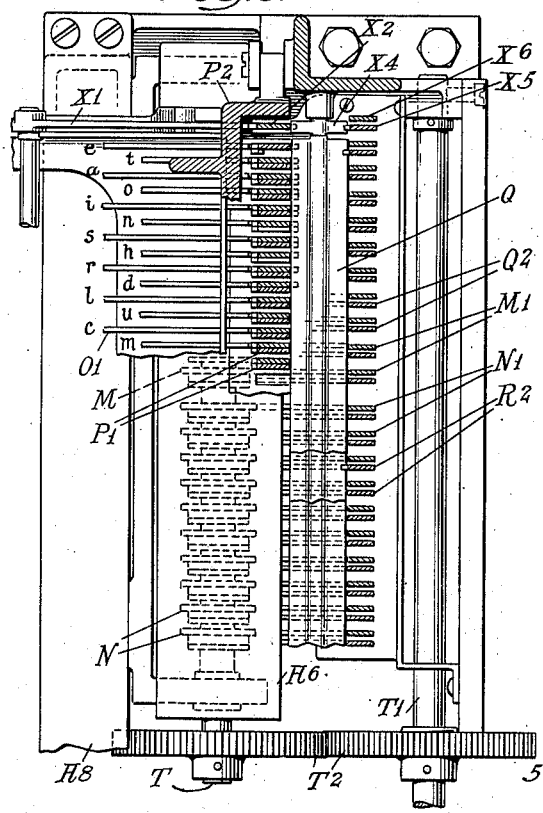
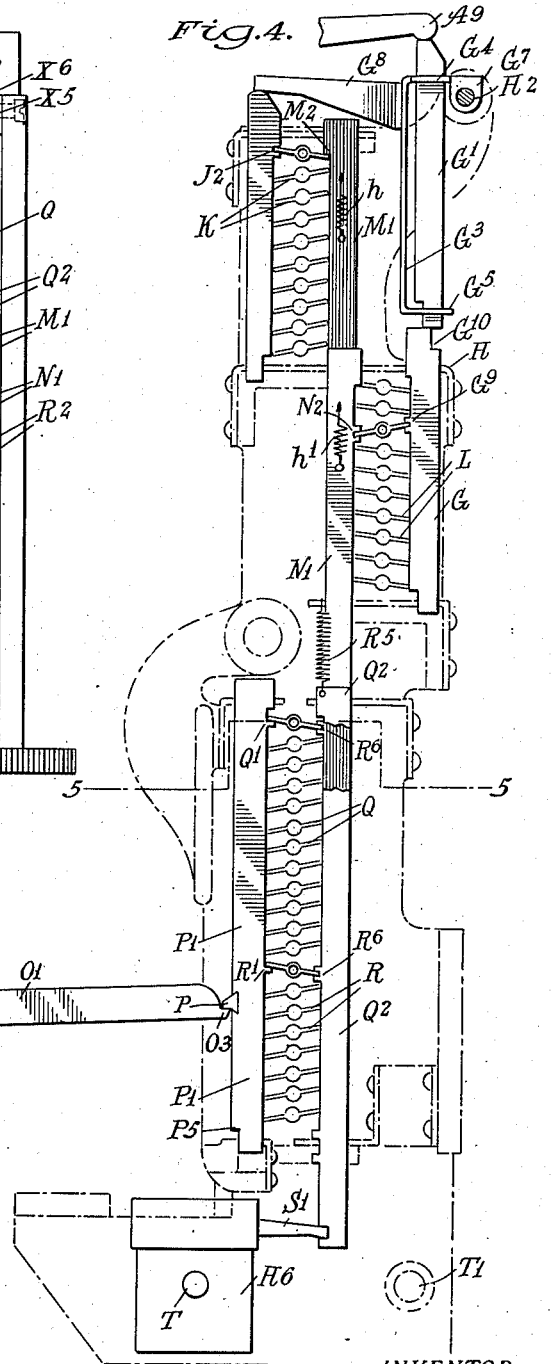

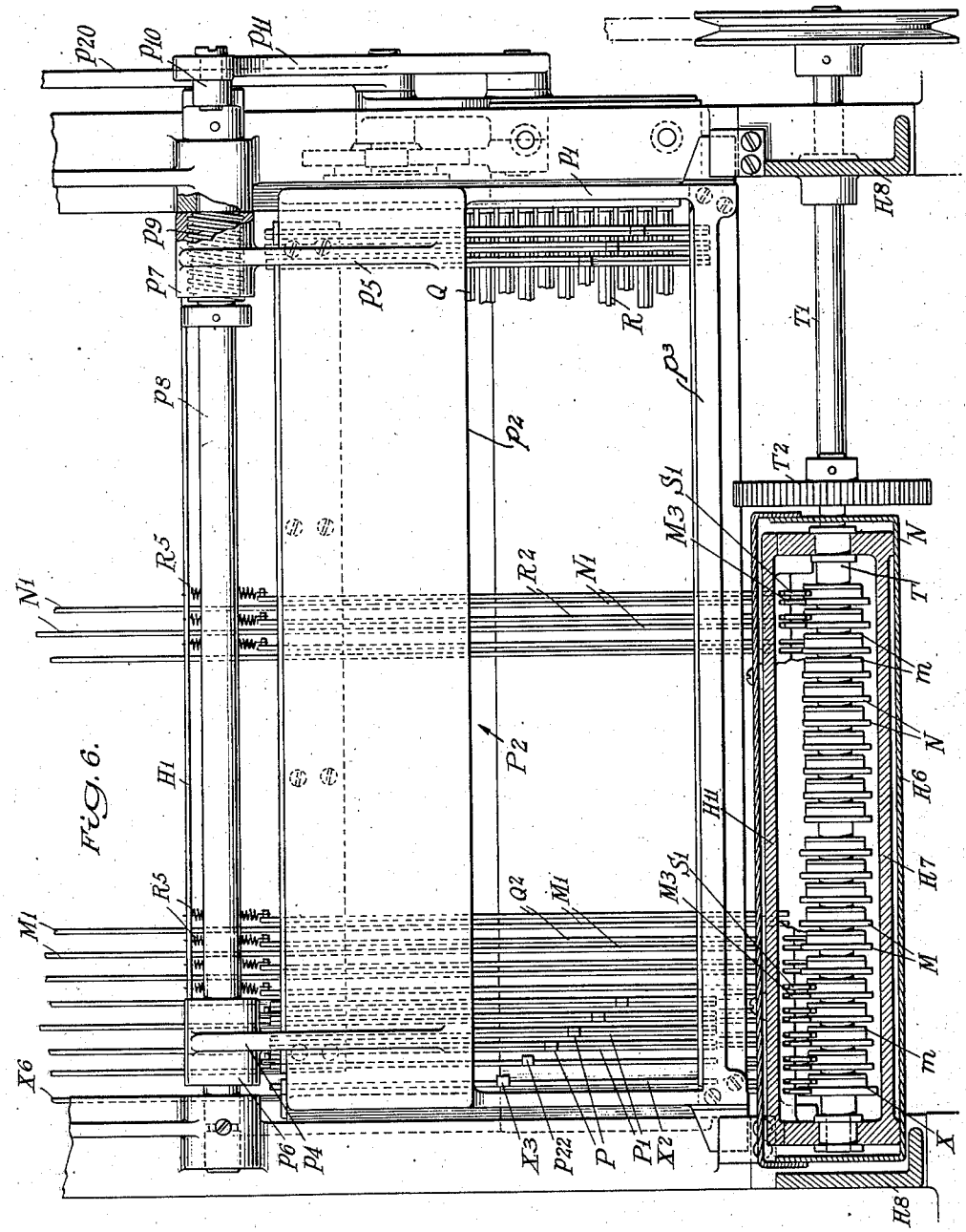

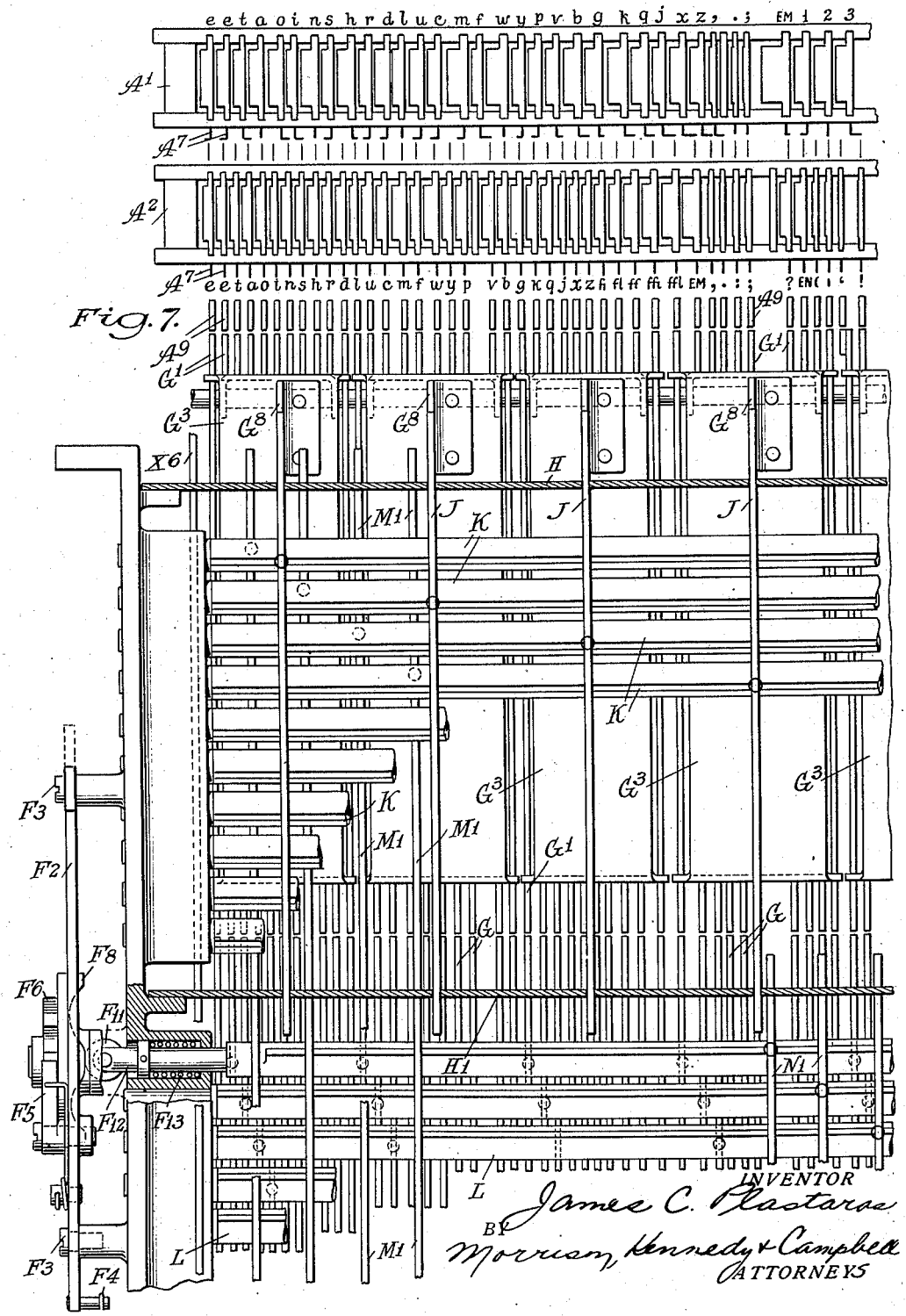

Nov. 12, 1940.   J. C. PLASTARAS   2,220,946
KEYBOARD MECHANISM
Filed June 19, 1939   9 Sheets-Sheet 6

INVENTOR
James C. Plastaras
BY Morrison, Kennedy & Campbell
ATTORNEYS

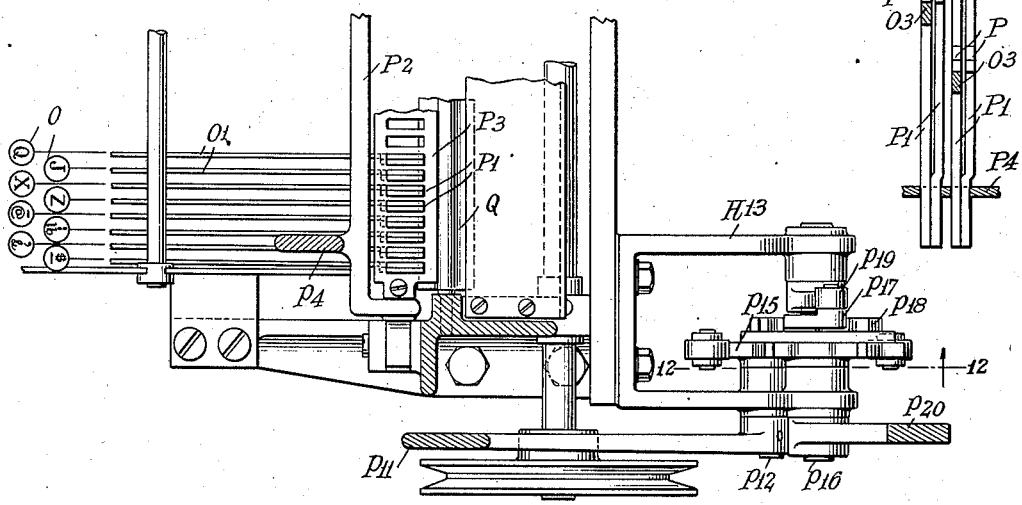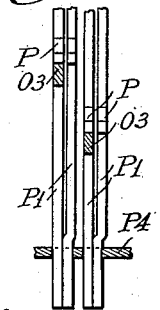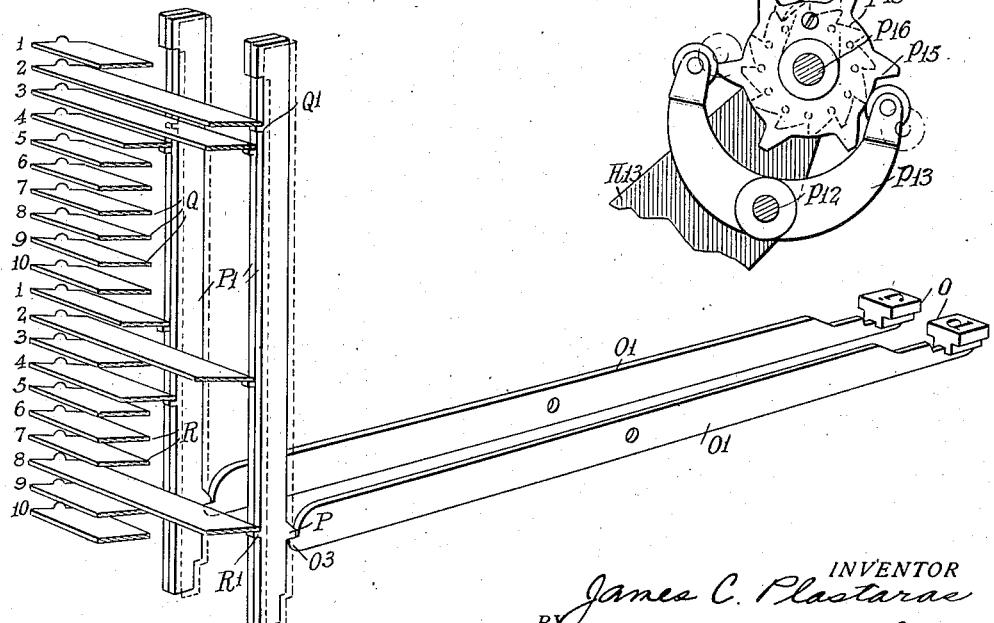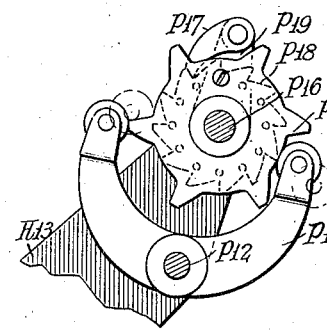

Nov. 12, 1940.  J. C. PLASTARAS  2,220,946
KEYBOARD MECHANISM
Filed June 19, 1939  9 Sheets-Sheet 9

INVENTOR
James C. Plastaras
BY
Morrison, Kennedy & Campbell
ATTORNEYS

Patented Nov. 12, 1940

2,220,946

UNITED STATES PATENT OFFICE 2,220,946

KEYBOARD MECHANISM

James C. Plastaras, Laurelton, N. Y., assignor to Mergenthaler Linotype Company, a corporation of New York Application June 19, 1939, Serial No. 279,902

28 Claims. (Cl. 199—16)

This invention relates to keyboard or escapement operating mechanism, such as is employed in commercial "Linotype" machines. In these machines, the escapements controlling the discharge of the matrices from the magazine are ordinarily actuated by vertical reeds operated by pivoted yokes or levers, one being provided for each of said reeds and containing a rotary cam or eccentric adapted to make peripheral contact with an underlying constantly rotating rubber-covered roll. The pivoted yokes are held normally with their cams at rest and out of contact with the rubber-covered roll and are released by the manipulation of finger keys, which permit the cam to fall into engagement with the driving roll and be rotated thereby to raise the yokes and operate the escapements. In practice, the life of the rubber-covered rolls is comparatively short by reason of wear and other deteriorating influences, and hence it is necessary at times to remove the worn rolls and substitute new ones, involving considerable expense and occasioning much inconvenience and loss of time. In addition, the wear of the rolls oftentimes results in the failure of the escapements to respond to the actuation of the finger keys, due to the insufficient raising of the cam yokes. Furthermore, and without regard to the question of wear, considerable slippage takes place between the cams and the rubber-covered rolls during their driving engagement, and especially when oil finds its way onto the rolls, resulting in a delayed actuation of the matrix-releasing escapements, and thus giving rise to transpositions of matrices in the composed line.

The present invention is intended to reduce to a large extent, the number of cams or eccentrics required and to do away also with the rubber-covered rolls and their attendant objections. To these ends, it contemplates a simple, compact arrangement wherein the cams or eccentrics are few in number, positively rotated, and their engagement and disengagement with and from the driving roll accomplished in a direct and reliable manner.

Thus, in the embodiment of the invention illustrated, despite the fact that there are ninety-five escapement operating reeds, only twenty cams or eccentrics are necessary to effect their operation. From this it will be appreciated that there is not only a radical reduction in the number of parts required, which adds to the compactness of the cam arrangement, but also a substantial decrease in the opportunities for the machine to get out of order.

According to the invention, the escapement operating reeds, instead of being continuous throughout as is normally the case, are divided into what, for the sake of description, will be termed main reed sections and auxiliary reed sections, the latter being arranged above the main reed sections and, under conditions hereinafter to be described, operable by said main reed sections to actuate the escapements which effect the release of the matrices from the magazines. The main reed sections, starting in order from the left of the machine, are divided into a plurality of groups, having an equal number of reed sections (say ten) in each group and with an additional group, if necessary, to contain the excess reed sections insufficient in number to make a full group. The auxiliary reed sections are correspondingly grouped so that there will be an auxiliary reed section corresponding to each main reed section of the latter groups. The auxiliary reed sections are normally out of operative relation with the main reed sections but, upon the manipulation of a finger key to release a given character, the group of auxiliary reed sections associated with the group of magazine channels among which is located the channel containing such character, is moved into operative relation with the corresponding group of main reed sections so that the auxiliary reed sections in such group are in condition to be operated by their corresponding main reed sections.

The main reed sections are operable in what for the sake of differentiation will be termed sets, each set including one main reed section, but only one, from each group and preferably the corresponding reed sections in said groups. For example, one set of main reed sections will include the first reed sections in the respective groups, another set, the second reed sections in the respective groups, another set, the third reed sections in the respective groups, and so forth. The connections from the keyboard are such that when the finger key for the release of a given character is manipulated, the particular set of main reed sections which includes the main reed section corresponding to such character is operated, and since at the same time the group of auxiliary reed sections including the particular auxiliary reed section corresponding to said character is conditioned for operation, said character will be released, but only such character, since the active set of main reed sections and the active group of auxiliary reed sections will have but one escapement device in common, namely, the one corresponding to the character in question.

With regard to the actuating cams, one cam is provided for conditioning each group of auxiliary reed sections, and one for actuating each set of main reed sections. Consequently the total number of cams required will be the sum of the number of groups of reeds plus the number of reeds in a group. Specifically, in the embodiment of the invention illustrated, wherein there is a total of ninety-five reeds, the reeds are divided into nine groups of ten reeds each, plus an additional group of four reeds to take care of the excess reeds that are insufficient to make a full group, making ten groups in all. Actually, one group of reeds, namely, the one including the reeds that release the character "e" at the extreme left contains eleven reeds (which accounts for the ninety-fifth reed), but this group can be considered as containing but ten reeds for reasons subsequently made plain. This arrangement will require twenty cams, i. e., a group of ten for conditioning the ten groups of auxiliary reed sections, and another group of ten for actuating the ten different reeds in each group, it being remembered, of course, that each cam actuating a main reed section simultaneously actuates a complete set of such main reed sections. From what has been said, it will be apparent that the minimum number of cams for a given number of reeds will be realized when the number of groups of reeds equals the number of reeds in the respective groups. Of course, this optimum condition cannot always be realized. Thus, if the machine had only ninety reeds, as would be the case if the machine were equipped for handling only ninety-character fonts, the minimum cam condition would be realized by having either nine groups of reeds with ten reeds to a group, or ten groups of reeds with nine reeds to a group, making nineteen cams in all. Twenty cams on the other hand, could, if desired, handle up to one hundred reeds, by arranging them in ten groups of ten reeds to the group.

The groups of auxiliary reed sections are arranged in individual frames pivotally mounted and, under normal conditions, located out of operative relation with the corresponding main reed sections. The corresponding cam group conditions the groups of auxiliary reed sections through trains of connections which include a group of bails, there being one train of connections with one bail therein connecting each cam with its corresponding auxiliary reed section group. The arrangement is such that, upon the operation of a selected cam, the connected group of auxiliary reed sections will be moved from its normal position into a position wherein the reed sections in said group will overlie the reed sections in the corresponding group of main reed sections so as to be operable thereby.

Similar trains of connections, including a similar group of bails, are provided for the operation of the main reed sections by the other group of cams. The bails in this group are connected each to a set of main reed sections, which set includes preferably a corresponding reed section from each group as previously stated, and upon the operation of a selected cam the corresponding set of main reed sections will be actuated. Thus, by simultaneously operating a cam selected from each group, a single character will be released in the manner previously set forth.

The simultaneous selection of the two cams is controlled from the keyboard and is likewise effected through bails, there being one group of bails for each group of cams, and with a bail in each group corresponding to a cam in the corresponding group. Each key of the keyboard through the medium of a key bar is connected with a pair of bails consisting of one bail from each group, so that upon the operation of such key, said pair of bails will control the operation of the corresponding pair of cams, it being understood, of course, that each key on the keyboard is connected, through its associated key bar, with a different pair of bails.

As illustrated, the invention has been adapted to a machine equipped to handle ninety-character and seventy-two-character matrix fonts. Because of the difference in the size of the matrices as between these fonts, the characters therein are differently located, with the result that the escapement operating reeds which effect the release of the characters from the ninety-character font are, for the most part, different from those effecting the release of the corresponding characters from the seventy-two-character font. This condition, in some cases, requires not only the operation of a different set of main reed sections for the release of a given character but also the conditioning of a different group of auxiliary reed sections. In order to meet this condition, and still permit the characters from the different fonts to be released by the operation of the same finger keys, an additional set of key bars is provided, one set to function in the release of the matrices from the ninety-character font and the other set in the release of matrices from the seventy-two-character font, provision being made for automatically connecting one set of key bars or the other for operation by the finger keys as a corresponding magazine is rendered operative for the release of matrices. The difference between the two sets of key bars is that, as required by the location of the characters in the two fonts, the key bars in one case will be connected with one pair of bails from the groups controlling the operation of the cams and in the other case with a different pair of bails from said groups.

The cams themselves are mounted on a metal driving roll and are provided with clutch members controlled from the bails that are actuated by the manipulation of the finger keys. Each clutch member acts through friction means positively to connect the cam with the driving roll and, as the cam is rotated thereby, it will effect the operation of a set of main reed sections or condition a group of auxiliary reed sections, as the case may be. When the cam has made one complete rotation, it is positively disconnected from the driving roll through the restoration of the clutch member to its normal condition. The configuration of the cams is such that as the rotation thereof is completed, the actuated set of main reed sections and the conditioned group of auxiliary reed sections are restored to normal position.

Numerous other features of the invention will be apparent from the following description and from the drawings wherein:

Fig. 1 is a side elevation of a portion of a Linotype machine equipped with the present improvements;

Fig. 2 is an enlarged vertical sectional view through the keyboard mechanism, showing the various bail groups, as well as the main and auxiliary reed sections, the various parts being in their normal positions;

Fig. 3 is a partial horizontal sectional view on line 3—3 of Fig. 2;

Fig. 4 is a view similar to Fig. 2, but showing the parts in their operative positions;

Fig. 5 is a horizontal view on line 5—5 of Fig. 4;

Fig. 6 is a partial front elevation showing the shiftable frame in which the key bars are mounted so as to connect one or the other sets thereof with the finger keys and showing also the arrangement of the cam groups;

Fig. 7 is a partial front elevation showing the groups of bails for actuating the sets of main reed sections and for conditioning the groups of auxiliary reed sections as well as the trains of connections of which the said groups of bails form a part;

Fig. 11 is a partial horizontal sectional view illustrating the double set of key bars and the mechanism for bringing one or the other of said sets of key bars into operative relation with the finger keys;

Fig. 12 is a vertical sectional view on line 12—12 of Fig. 11;

Fig. 13 is a perspective view illustrating the connections of the double set of key bars with the groups of bails that control the operation of the cams;

Fig. 14 is a view illustrating the construction and mounting of the double key bars;

Figure 20:
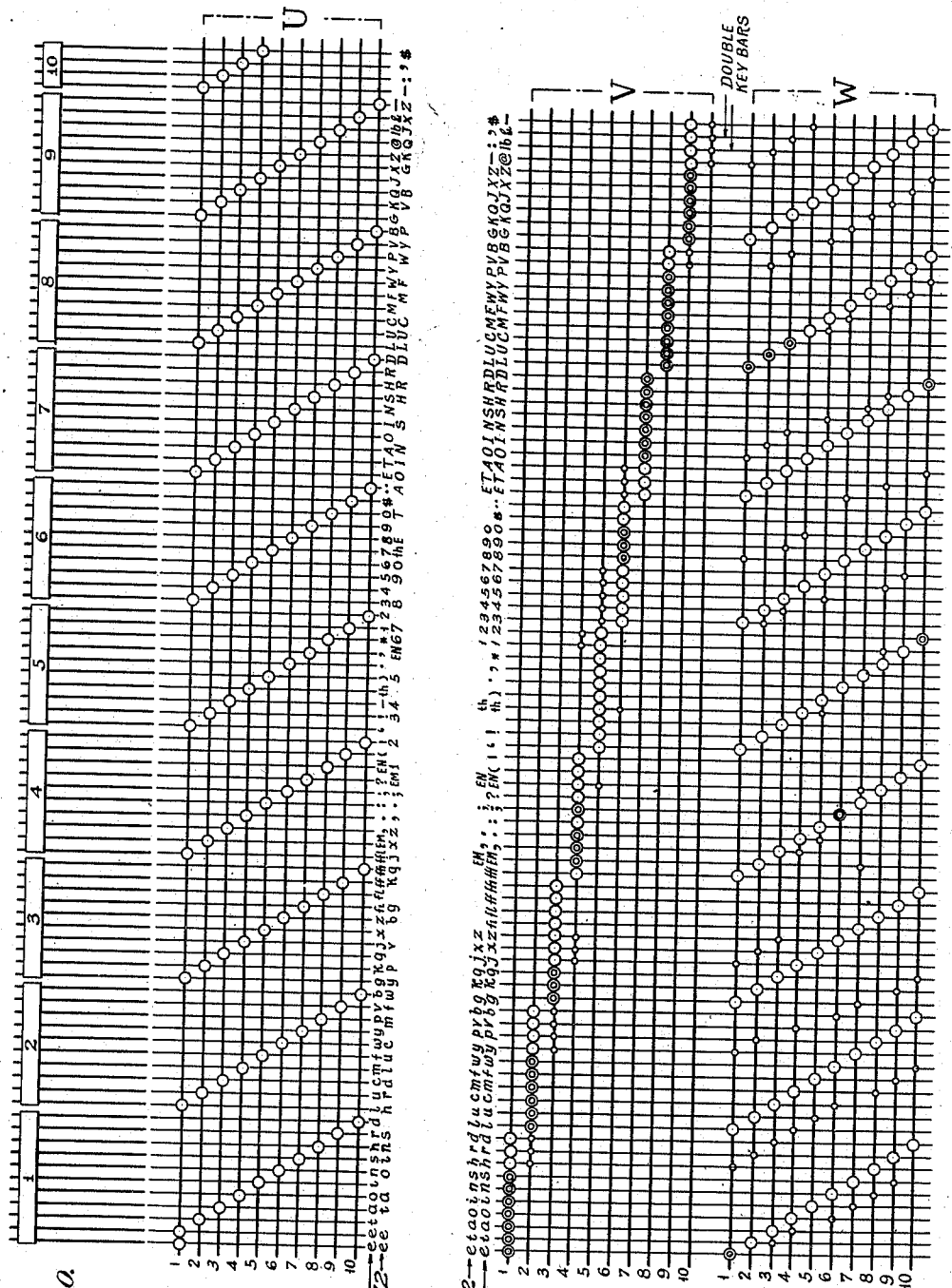

Fig. 20 is a chart illustrating diagrammatically the grouping of the main and auxiliary reed sections, the manner in which the main reed sections are allocated to the different sets for simultaneous operation by the respective bails that actuate said main reed sections, and also the connections of the key bars to the groups of bails that control the selection of a pair of cams for the release of the different characters.

The invention (see Fig. 1) has been illustrated in connection with a machine equipped with four superposed magazines $A^1$, $A^2$, $A^3$, $A^4$, two of which, say, the second and fourth ($A^2$ and $A^4$), are of standard form, being provided each with ninety-one grooves or channels spaced apart in the usual way so as to contain a regular ninety-character font, whereas the top or first magazine $A^1$ and the third magazine $A^3$, although of the same width as the other magazines, are provided each with only seventy-three grooves or channels spaced apart in a different manner so as to contain a seventy-two-character display font. The magazines are mounted on separate base frames constituting part of a shift frame $A^5$ which is arranged to be raised and lowered in well known manner, as by the operation of a hand crank $A^6$ at the front of the machine, to bring any selected one of the magazines into operative position.

When either of the ninety-character font magazines is in operative postion, the regular magazine entrance B is employed to deliver matrices thereto from the distributing mechanism; whereas when either of the seventy-two-character font magazines occupies such operative position, the special magazine entrance $B^1$ is so employed. The two entrances differ in the number and spacing of their partition plates, the entrance B presenting ninety-one channels to cooperate with the magazines $A^2$ and $A^4$, and the entrance $B^1$ presenting seventy-three channels to cooperate with the two remaining magazines $A^1$ and $A^2$. The entrances, arranged in inverted relation to each other, are rotatably mounted so that either may be brought into the operative position as desired. Their individual supporting frames are fastened together and constitute a reversible holder or support $B^2$ which may be given successive half rotations to bring first one entrance and then the other into use. The substitution of one entrance channel for the other is accompanied by a corresponding substitution of one distributor bar $B^3$ or $B^4$ for the other so that the proper distributor bar for the font in operative position will be employed. The mechanism for effecting the substitution of the entrance channels one for the other and the corresponding substitution of the distributor bars is not shown in detail, being well known. Suffice it to say, when a seventy-two-character font magazine is substituted for a ninety-character font magazine or vice versa, the corresponding substitution of the proper entrance channel and distributor bar is effected from the front of the machine by means of a fore-and-aft slide bar C operating through a lever $C^1$ connected at the rear end of said bar, and which is pulled forward to the dotted line position shown in Fig. 1 and then returned to its normal or solid line position shown therein.

When a magazine is in operative position, it registers at its front end with a throat D through which the matrices are conveyed in usual manner to an assembler entrance E from which the matrices pass to the assembler elevator F where they are composed in line. Since the throat D for a ninety-character font magazine differs from that for a seventy-two-character font magazine, an additional throat $D^1$ is provided arranged back to back with the throat D and on a suitable frame which is rotatable to bring one or the other of the throats into operative position depending upon the magazine in use.

Each of the magazines, $A^1$, $A^2$, $A^3$, $A^4$ is equipped with an individual bank of escapement devices $A^7$, the selective operation of which releases the desired character from the magazine, and when a magazine is brought into operative position, these escapement devices are brought into registry with a series of centrally pivoted escapement operating levers $A^8$ arranged to be operated in turn by a corresponding series of bell-crank levers $A^9$ pivotally mounted on a cross bar $A^{10}$ fixed in the machine (see Fig. 1). The arrangement is such that when the bell-crank levers are rocked in a counter-clockwise direction, the corresponding escapement devices are operated and, of course, after such operation of the escapement devices they as well as the bell-crank levers, are returned to their normal positions.

As so far described, the parts, their construction and mode of operation are well known.

As stated at the outset, one of the objects of the present invention is to reduce the number of reed operating cams or eccentrics through which the escapement devices are operated and, for this purpose, the reeds are divided longitudinally into main reed sections G and auxiliary reed sections $G^1$ (Fig. 2) which are arranged in groups according to the plan hereinafter set forth. The main reed sections G are arranged for limited movement in a vertical direction, being guided at their upper and lower ends, respectively, in slots formed in cross plates H and $H^1$ fixed in the machine frame. These reed sections are somewhat reduced in width at their lower ends so as to present shoulders $G^2$ adapted to seat upon the cross plate $H^1$ when said reed sections are in their normal positions of rest, it being understood that the slots in said supporting cross plate $H^1$ are shorter in length than the width of the body portions of the reed sections.

The auxiliary reed sections $G^1$ overlie the main reed sections and, in turn, underlie the levers $A^9$ through which the escapement devices are operated. Each group of auxiliary reed sections (see Figs. 2 and 8) is mounted in a frame $G^3$ formed at its upper and lower ends with rearwardly extending flanges $G^4$ and $G^5$ presenting slots in which the auxiliary reed sections are guided at the top and bottom. As in the case of the main reed sections G, the auxiliary reed sections $G^1$ are somewhat reduced in width at their lower ends so as to present shoulders $G^6$ which seat upon the flanges $G^5$ when the reed sections are in their normal positions of rest. Here, too, the slots guiding the auxiliary reed sections at their lower ends are shorter in length than the width of the body portion of the auxiliary reeds in order that a supporting surface for said reed sections will be presented.

Figure 8:
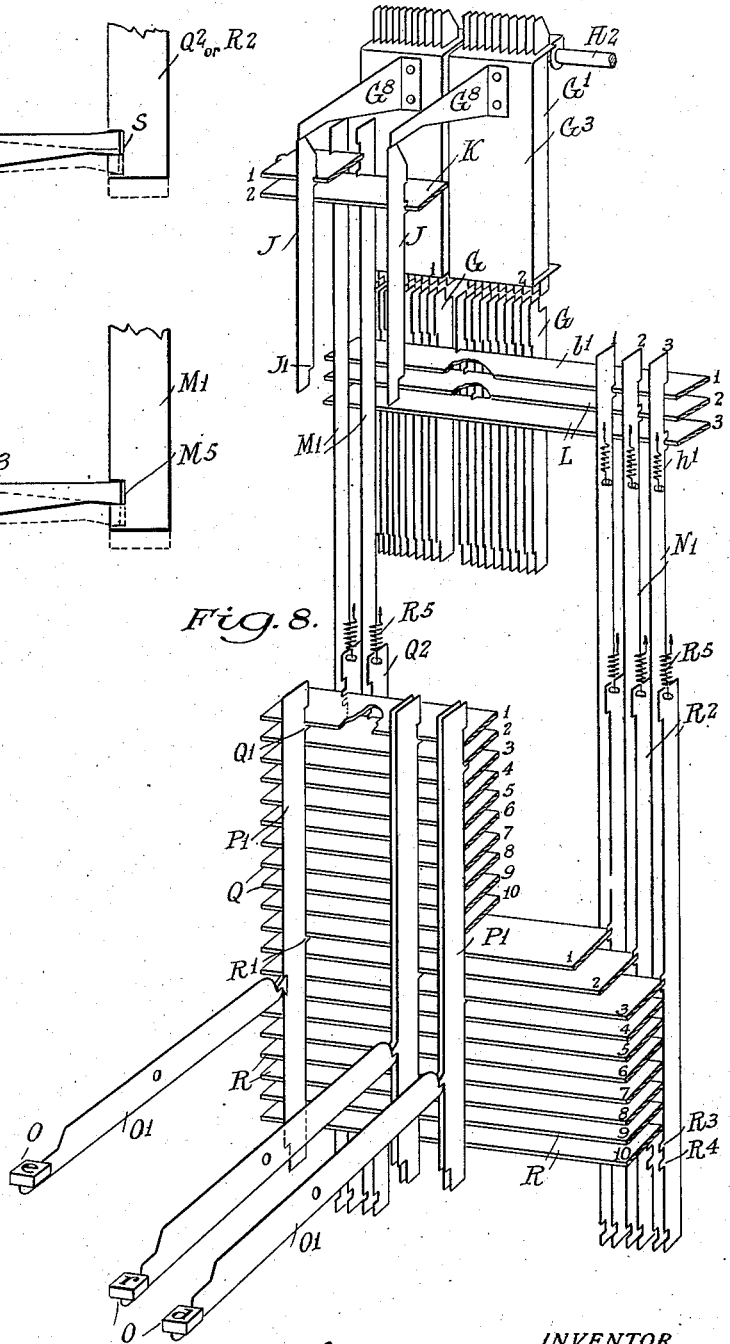
Fig. 8 is a perspective view showing the arrangement of the various groups of bails and the manner in which their control and operation of the reed sections are effected.

The flanges $G^4$ at the top of the auxiliary reed supporting frames $G^3$ are somewhat longer than the flanges $G^5$ at the bottom and are formed at their opposite ends with depending ears $G^7$ presenting holes through which there extends a cross bar $H^2$ supported at its opposite ends in fixed parts of the machine (Figs. 2 and 8). The respective auxiliary reed section supporting frames $G^3$ are free to rock on the cross bar $H^2$ so that the frames can be swung from the position shown in Fig. 2, wherein the auxiliary reed sections $G^1$ stand clear of the underlying main reed sections G, to the position shown in Fig. 4, wherein the auxiliary reed sections are in alinement with the underlying main reed sections so as to be operable thereby.

Extending forwardly from each of the auxiliary reed section supporting frames $G^3$, is an arm $G^8$ fastened at its rear end to the frame and which at its front end overlies and engages with a vertical bar J guided at the top and bottom for limited vertical movement in slots formed in a fixed cross plate $H^3$ and in the aforementioned cross plate H, there being one bar J for each of the auxiliary reed section groups. The slots in the lower cross plate H are smaller than those in the upper cross plate $H^3$ in order to provide a supporting surface for shoulders $J^1$ presented by said bars, as by notching them at the bottom. When the bars J are in their normal positions of rest with their shoulders seated upon the cross plate H (Fig. 2), the auxiliary reed sections $G^1$ will be in their normal positions wherein they are located by gravity, due to the fact that the position of the centers of gravity of the frames and supported reed sections are offset toward the front from a vertical plane passing through the supporting rod $H^2$. However, when the bars J are raised, they will, through the overlying arms $G^8$, rotate the frames $G^3$ to bring the auxiliary reed sections therein into alinement with the underlying main reed sections G, so that upon the raising of the latter the auxiliary reed sections will likewise be raised to operate the overlying bell-crank levers and the corresponding escapements.

As previously mentioned, the machine is equipped with ninety-five reeds in all, considering a main reed section with its corresponding auxiliary reed section as one reed. This number is made up as follows: The ninety-character font being provided with ninety-one channels requires ninety-one reeds for the release of matrices therefrom. For the most part, the same reeds are used to release matrices from the seventy-two-character fonts. However, the seventy-two-character font is provided with four channels at the extreme right which are located beyond the right-most channel of the ninety-character font magazines. Four additional reeds are therefore required for the release of matrices from these channels, which added to the ninety-one reeds make ninety-five reeds in all. These reeds are divided into ten groups, the first group at the left of the machine containing eleven reeds, the last group at the right four reeds, and all of the remaining groups ten reeds each. Each group of auxiliary reed sections is mounted in an individual frame $G^3$ as already described, which can be selectively conditioned so as to locate the reed sections therein in position for operation by the group of underlying main reed sections.

In order selectively to condition the groups of auxiliary reed sections, there is provided a group of horizontally located bails K pivotally mounted at their opposite ends in the fixed framework of the machine (see Figs. 2, 7 and 8). These bails are superposed, one above the other, and are arranged so that their front edges engage each in a notch $J^2$ formed in the rear edge of a different one of the auxiliary reed section group conditioning bars J. Thus, the top bail of the group K is connected to the bar J active in conditioning the group of auxiliary reed sections at the extreme left; the second bail from the top is connected to the bar J active in conditioning the second from the left group of auxiliary reed sections; the third bail with the bar active in conditioning the third from the left group of auxiliary reed sections, and so on; and, as there are ten of said groups of auxiliary reed sections, there will be ten of such bails K in this group. The normal position of the bails is shown in Fig. 2, but when they are rocked in a clockwise direction, as in the case of the top bail K shown in Fig. 4, the bars J respectively operated thereby, will be raised to effect the conditioning of the corresponding auxiliary reed section groups.

The main reed sections G are likewise operated through a group of bails L (Fig. 2). Whereas, however, each bail associated with the auxiliary reed sections conditions a group of the latter, the bails associated with the main reed sections each actuate what, for the sake of differentiation, has been termed a set of main reed sections, such a set including a main reed section from each group thereof, and preferably the corresponding reed sections in said groups. Disregarding, for the time being, the extra reed section in the first group, it will be recalled that there are ten main reed sections in each group, with the exception of the group at the extreme right which is provided with only four reed sections. If, now, each bail L is to actuate a set of reed sections consisting of a corresponding reed section from each group, it will be apparent that, as the number of reed sections to a group is ten, ten bails will be required to operate all of the main reed sections. To be more explicit, and with reference to the chart in Fig. 20, wherein opposite the letter U the bails are illustrated by horizontal lines, the reed sections by vertical lines, and the connections therebetween by circles, it will be observed that the first or top bail is connected to the first main reed section in each group; the second bail to the second main reed section of each group; the third bail to the third main reed section of each group, and so on. Since there are only four main reed sections in the last group at the right, only the first four bails will be utilized for the operation of the main reed sections in this group.

Referring now to Figs. 2 and 7, it will be observed that the bails L for operating the main reed sections G are likewise horizontally arranged in superposed relation and pivotally mounted at their opposite ends in a fixed portion of the machine framework. These bails, at their rear edges, engage in notches $G^9$ formed in the front edges of the main reed sections G to which they are respectively connected, the relative locations of the notches and the bails depending upon the bails to which the main reed sections are connected. The normal positions of the bails L are shown in Fig. 2, but when a selected one thereof is operated, it is turned in a counterclockwise direction to an angular position such as that indicated by the third bail in Fig. 4 as shown in solid lines, and when the bails are thus turned, the sets of reed sections connected respectively thereto will be raised. Since, however, the set of main reed sections operated at any given time will include but a single reed section from each group and as but one group of auxiliary reed sections will be conditioned at such time, only one auxiliary reed section will be operated, namely, the one registering with the active main reed section of the corresponding main reed section group. All of the active main reed sections in the other groups will have no effect and will merely move up clear of the corresponding auxiliary reed sections which are in the unconditioned groups. In brief, then, the escapement device operated at any given time will be the one corresponding to the actuated main reed section in the group corresponding to the conditioned group of auxiliary reed sections. At this point, it might be mentioned that the main reed sections G are notched at their upper ends as at $G^{10}$ so as to permit them to clear the auxiliary reed sections when the latter are in their normal or non-conditioned positions (see Fig. 2).

Before proceeding with a description of the manner in which the bails of the two groups K and L are selectively operated, mention will be made of the reason why the first group of auxiliary and main reed sections includes eleven of such sections instead of ten only, and why this group may be considered as having but ten reeds. The first two channels at the left of a magazine, whether it contain a ninety-character font or a seventy-two-character font, are devoted to the character "e" because of the relatively large number of times this letter is used in composition. In ordinary operation, matrices bearing the character "e" are released from one of said channels during the composition of one line and from the other of said channels during the composition of the next line, means being provided for shifting the connections for effecting the release of the character from one channel to the other after the composition of each line. The present machine is no exception, and the mechanism for effecting the shift of escapement operating connections from one channel to the other is illustrated in Figs. 1, 2, 3 and 7. The main reed sections $g^1$, $g^2$ active in the release of the character "e" are, of course, located at the extreme left and are both operated by the topmost bail $l^1$ of the group L actuating the main reed sections. This bail is mounted for limited movement in an endwise direction, and when located in the position shown in solid lines in Fig. 3, it will cooperate with the second main reed section $g^2$ from the left and stand clear of the first main reed section $g^1$. Consequently, only the former will be operable, and since it is connected with the second magazine channel, the matrices therein will be released when the letter "e" is composed. On the other hand, when the bail $l^1$ is moved to the left to the position shown in dotted lines in Fig. 3, said bail will cooperate with the first main reed section $g^1$ and clear the second main reed section $g^2$ by virtue of a notch $l^2$ located in the bail and which registers with the second main reed section when the bail is in its leftmost position. Under these circumstances, the operation of the bail $l^1$ in the release of the character "e" will be effective only in connection with the first magazine channel containing such characters. The endwise movement of the bail, of course, will have no effect upon the operation of the other main reed sections of the set operated by this bail.

The endwise movement of the bail $l^1$ is effected from the assembly elevator F. For this purpose, the elevator (see Fig. 1) is formed at the rear with a finger $F^1$ which, as the elevator is raised from the solid line position to the dotted line position shown in said figure for the transfer of a composed line, engages the forward extension of an angular shaped bar $F^2$ mounted for limited movement in a vertical direction, as determined by pin and slot connections $F^3$ with the fixed framework (Fig. 2), to raise said bar against the tension of a spring $F^4$, secured to said bar at its lower end and having a fixed anchorage in the machine. As the bar $F^2$ is raised, a pawl $F^5$, pivotally mounted thereon, causes a ratchet wheel $F^6$ (Figs. 2 and 3) against which the pawl is spring pressed, to partake of a limited rotation. The ratchet wheel $F^6$ is rotatably mounted upon a stud $F^7$, fixed in the framework, and has formed integrally therewith a face cam $F^8$ presenting a series of alternate high and low portions $F^9$ and $F^{10}$. An anti-friction roller or cam follower $F^{11}$, mounted at the outer end of a bar $F^{12}$ on which the top bail $l^1$ is pivotally arranged, is held in contact with the face cam by means of a compression spring $F^{13}$ reacting between the base of a circular hole $F^{14}$ through which the bar extends and a collar $F^{15}$ mounted on said bar and which slides along the cylindrical surface of said hole. According to this arrangement, the successive ascensions of the assembler elevator F will, through the ratchet and pawl mechanism just described, cause the cam $F^8$ to be rotated alternately to bring a high portion $F^9$ and then a low portion $F^{10}$ opposite the cam follower $F^{11}$ with the result that, during the composition of alternate lines, the topmost bail $l^1$ will be in a position to cooperate at at one time with the main reed section $g^2$ and at another time with the main reed section $g^1$. In order that the bail $l^1$ will follow the movement of the bar $F^{12}$ to its different positions of adjustment, the bail is connected to the bar by a pin and slot connection $F^{16}$, the pin extending from the bar into the slot which is located in the bail, and the slot being of a length sufficient to permit the normal rotation of the bail as required for the operation of the main reed sections. Of course, there is an auxiliary reed section in the first group for each of the main reed sections operable for the release of the character "e", but only one thereof can be operated at any time, depending upon which of the main reed sections the bail $l^1$ is connected to. Thus, while there are eleven main reed sections and eleven auxiliary reed sections in the first group, only ten thereof will be operable at any time so that for all practical purposes this group may be considered as one of only ten reeds.

The group of bails K controlling the conditioning of the groups of auxiliary reed sections $G^1$, and the group of bails L controlling the actuation of the main reed sections G, are operated from corresponding groups of cams M and N, best shown in Fig. 6, wherein the group of ten at the right contains the cams for operating the main reed sections, and the group at the left the cams for conditioning the auxiliary reed section groups. As shown, the group at the left contains eleven cams, but one of these cams, namely, the leftmost one, is employed in the release of spacebands as will later be described, so that actually the group of cams for conditioning the auxiliary reed sections likewise includes ten.

As shown best in Figs. 2 and 8, each bail K of the group for conditioning the auxiliary reed sections is connected for operation by a cam of the corresponding group M through the medium of a long flat rod $M^1$ guided at the top in a slot formed in the aforementioned cross plate $H^3$ and at the bottom in a slot formed in a cross plate $H^4$ fixed to the framework. The rod $M^1$ at the left presents a shoulder $M^2$ overlying the top bail at its rear edge; the second rod, a similar shoulder $M^2$ overlying the second bail from the top; and the third rod, a similar shoulder $M^2$ overlying the third bail from the top, and so on, the arrangement being such that as the said rods are moved downwardly for a limited distance, the bails to which they are connected will be turned in a clockwise direction to effect the conditioning of the groups of auxiliary reeds in the manner hereinbefore described (see Fig. 4). It will be understood, of course, that the rods $M^1$ are formed so as to clear all of the bails of the group K with the exception of the ones to which they are respectively connected. Upon the raising of said rods to their normal position, which is brought about through the medium of tension springs $h$ connected to the rods and anchored to the aforementioned overlying plate $H^3$, the bails to which they are connected will be permitted likewise to return to their normal positions (Fig. 2) under the influence of the rods J.

A similar but shorter group of flat rods $N^1$ is provided for the operation of the bails L that actuate the main reed sections G. These rods are guided for limited vertical movement at the top in slots formed in the cross plate H and at the bottom in slots formed in the cross plate $H^4$. These rods $N^1$ in their rear edges and at various heights, depending upon the bails to which they are connected, present each a notch $N^2$ into which the front edge of the associated bail projects. Here again, the rods are formed so that they will clear all of the bails L except the ones to which they are connected. As in the case of the rods $M^1$, the first rod $N^1$ at the left is connected to the top bail; the second rod from the left to the second bail; the third rod to the third bail, and so on. As the rods are moved downwardly, the bails to which they are connected will be rocked in a counterclockwise direction to raise the sets of main reed sections L to which they are connected (see Fig. 4), and as the rods are moved upwardly to their normal positions under the action of tension springs $h^1$ connected to the rods and anchored to the overlying plate H, the bails L will be restored to their normal positions, as shown in Fig. 2, with the consequent restoring of the main reed sections.

Figure 10:
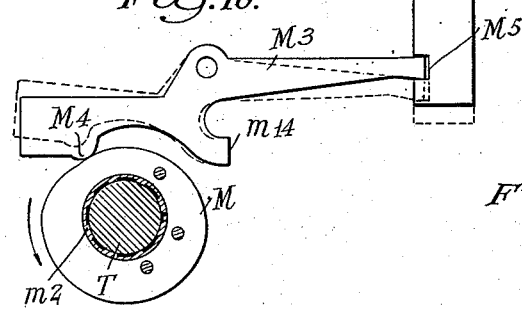
Fig. 10 is a vertical sectional view through the driving roll, showing the cam actuated means for operating a train of connections controlling the conditioning of an auxiliary group of reed sections, or for actuating a set of main reed sections.

The rods $M^1$, $N^1$ are actuated from their respective cams M and N through pivotally mounted levers $M^3$ (see Fig. 10). These levers, near their front ends, are formed with protrusions $M^4$, adapted to track upon the peripheries of the cams, and at their rear ends project into notches $M^5$ formed in the lower ends of the rods $M^1$ and $N^1$. In the normal position of the cams, the levers $M^3$ rest upon corresponding low portions thereof but, during the rotation of the cams, high portions thereof will arrive opposite the levers, causing them to be moved from the solid line position shown in Fig. 10 to the dotted line position shown therein, with the result that the rods $M^1$ and $N^1$ will be moved downwardly for their operative stroke. After the cams have completed a rotation, the levers will be restored to normal position as the rods $M^1$ and $N^1$ move upwardly to their normal positions under the action of their associated tension springs $h$ and $h^1$.

Before describing the specific cam construction, mention will first be made of the manner in which the cams M and N are selected for operation. It will be recalled that the release of a given character from the operative magazine requires the simultaneous conditioning of a group of auxiliary reed sections $G^1$ and the actuation of a set of main reed sections G. This in turn involves the selection for operation of a cam from each of the groups M and N, the selection being effected through the manipulation of the finger keys O.

The finger key arrangement (see Fig. 2) is of the usual type and consists of banks of key levers $O^1$ pivotally mounted adjacent their centers on rods $O^2$ extending transversely of the keyboard. At their rear ends, the key levers are formed with projections $O^3$ which underlie forwardly projecting portions P formed on a set of vertical key bars $P^1$ arranged in a frame $P^2$ (Figs. 2 and 6) just at the rear of said key levers. There is one of such key bars in the set for each key lever. These key bars $P^1$ are guided for limited vertical movement at the top and bottom in slots formed in cross plates $P^3$ and $P^4$ secured to the frame $P^2$, and are notched at their lower ends to present shoulders $P^5$ that engage a fixed frame ledge $P^6$ which thus determines their normal positions. Just rearwardly of the bars $P^1$, there are provided two groups of superposed pivotally mounted bails arranged with their axes in vertical alinement, one group consisting of the ten upper bails Q, and the other group consisting of the ten lower bails R (Figs. 2 and 8). As in the case of the other bails, these bails Q and R are pivotally mounted at their opposite ends in fixed portions of the machine. Each key bar $P^1$ is formed in its rear edge with two spaced projections $Q^1$ and $R^1$, one projection being arranged to underlie the front edge of a bail in the upper group Q, and the other to underlie the front edge of a bail in the lower group R (Fig. 8). In short, each key bar is connected to a pair of bails, one from each group, and each key bar in the set is connected with a different pair of such bails.

The cams in the respective groups M and N are controlled from the bails of the corresponding groups Q and R through the medium of vertical bars (see Figs. 2, 6 and 8) located at the rear of the bails and which are likewise arranged in groups $Q^2$ and $R^2$. The group of bars $Q^2$ for controlling the operation of the cams M (active in the conditioning of the groups of auxiliary reed sections $G^1$) is located at the left (see Fig. 6), the bars of said group being alternately spaced with respect to the bars $M^1$ that are operated by the cams in the conditioning operations. The bars $R^2$ controlling the operation of the cams N (active in the operation of the sets of main reed sections G) are located at the right (see Fig. 6) and likewise are alternately spaced with respect to the bars $N^1$ operated by the cams in the actuation of said sets of main reed sections. Both groups of bars $Q^2$ and $R^2$ are arranged for limited vertical movement and are guided at their upper and lower ends in slots formed in the cross plates $H^5$ and $H^4$, respectively, (Fig. 2). Near their lower ends, the bars $Q^2$ and $R^2$ are formed with spaced projections $R^3$ and $R^4$ straddling the plate $H^4$ and which limit the movement of the bars in both directions, the bars normally being held in their uppermost positions, with the lower projection $R^4$ banking against the underside of the plate $H^4$, by tension springs $R^5$ connected to the bars at the top and anchored to the overlying plate $H^1$. The bars in the group $Q^2$ at the left are connected one to each of the bails Q in the upper group, the leftmost bar being connected to the top bail, the second bar from the left to the second bail from the top, the third bar from the left to the third bail from the top, and so on. The bars $R^2$ in the group at the right are connected each to one of the bails R in the lower group. Here too, the leftmost bar $R^2$ is connected to the top bail R of the lower group, the second bar from the left to the second bail from the top, the third bar to the third bail from the top, and so on. The connection of the bars $Q^2$ and $R^2$ with their respective bails Q and R is through the medium of a pair of lugs formed on the front edge of each of said bars and presenting a notch $R^6$ into which the rear edge of the corresponding bail projects, it being understood, of course, that the notches presented by the bars are located at different levels depending upon the bails with which they are connected. According to this arrangement, when a given finger key O is depressed, the associated key bar $P^1$ is raised, causing two bails (one from the group Q and one from the group R) connected thereto to be rocked in a clockwise direction to the position shown by the two bails in solid black lines in Fig. 4. The two bails so operated, being in different groups, will depress two of the cam control bars, one bar in the group $Q^2$ at the left (which controls the operation of the cams M that condition the auxiliary reed sections) and the other bar in the group $R^2$ at the right (which controls the actuation of the main reed sections).

Figure 9:
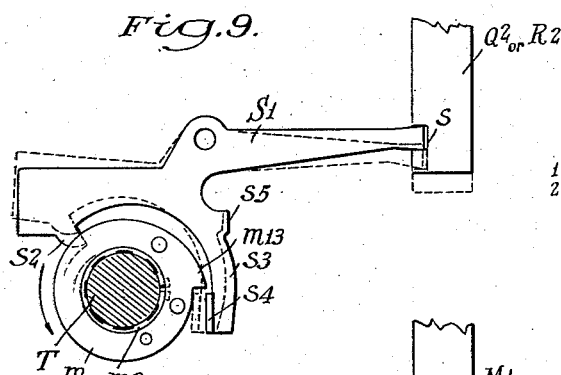
Fig. 9 is a vertical sectional view through the driving roll, showing the construction of the means through which the cam clutch device is controlled.

The cams M and N are controlled from the bars $Q^2$ and $R^2$ through means which include centrally pivoted levers $S^1$ which project at their rear ends into notches $s$ formed near the lower ends of the bars (Fig. 9). After the cams have been operated, the active bars are restored to their normal positions through the tension springs $R^5$ previously alluded to. The bars, in turn, restore to normal position, the bails Q and R, the key bar $P^1$ and the finger key O.

The cam arrangement will now be described. The cams M and N (see Fig. 6) are all compactly arranged in a housing $H^6$, located beneath the keyboard, and are mounted on a constantly rotating metal drive shaft T movable relatively to the cams which under normal conditions have a definite location. The shaft T is journalled at its opposite ends in bearings formed in end pieces of a casting $H^7$ which is bolted to a bracket $H^8$ screwed on a fixed portion of the machine frame. Movement is imparted to the drive shaft from a countershaft $T^1$ through gear connections $T^2$, the countershaft in turn being belt driven as usual (see Figs. 1, 5 and 6). The housing $H^6$ may contain oil to a level somewhat above the cams so that the cam mechanisms operating in oil at all times will be exceedingly quiet and substantially devoid of wear.

Figure 16:
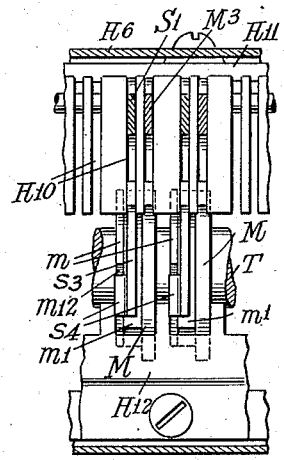
Fig. 16 is a vertical sectional view on line 16—16 of Fig. 15.
Figure 17:
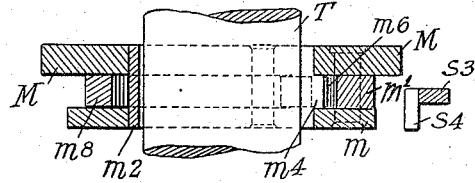
Fig. 17 is a horizontal sectional view on line 17—17 of Fig. 15.

The individual cam assembly (see Figs. 15, 16 and 17) includes the cam M (the cam N being the same insofar as concerns the mechanism now to be described) mounted on the drive shaft T (the latter normally being movable relatively to the cam assembly, i. e. disconnected therefrom), and a plate $m$ fastened thereto and held in spaced relation therewith by an intermediate spacing member $m^1$. The member $m^1$ is arcuate in shape and extends substantially 180° around the shaft. The cam assembly also includes a clutch device comprising a split friction band $m^2$ presenting shoulders $m^3$ and $m^4$ at the ends of the band where the same is split. One shoulder $m$ banks against an abutment $m^5$ presented by the spacing member $m^1$, while the other shoulder $m^4$ banks at one end of a small interponent $m^6$ located between the cam M and plate $m$ and which is free to move in sliding relation with respect to the spacing member $m^1$, the latter being formed with a bearing surface for the purpose. The interponent $m^6$, at its opposite end, is engaged by a short arm $m^7$ of an arcuate shaped lever $m^8$ pivotally mounted on a pin $m^{15}$ extending transversely between the cam and plate. The lever $m^8$ extends approximately half way around the shaft T and is engaged adjacent the end of its long arm by a compression spring $m^9$ seated in a recess formed in the intermediate spacing element $m^1$. In the same vicinity, the lever $m^8$ presents a shoulder $m^{10}$ which is pressed by the spring $m^9$ against a projection $s^2$ formed at the front end of the lever $S^1$ which, as will be recalled, is connected at its rear end with one of the bars $Q^2$ or $R^2$ actuated from the bails Q or R. As the bar, under the influence of its associated bail, is depressed in the manner previously described, the projection $s^2$ on the lever $S^1$ is moved upwardly out of the path of the clutch lever $m^8$. As the lever $m^8$ is thus released, the spring $m^9$ causes the lever to exert great pressure on the interponent $m^6$ because of the relatively large mechanical advantage resulting from the manner in which the lever is constructed. The interponent transmits the exerted pressure to the shoulder $m^4$ of the band $m^2$ with the result that the two ends of the latter are squeezed between the interponent and the shoulder $m^5$ of the spacing member $m^1$. This squeezing together of the ends of the split band $m^2$ causes the latter frictionally to grip the driving roller T, with the result that the cam unit is positively driven by the roller.

Figure 15:
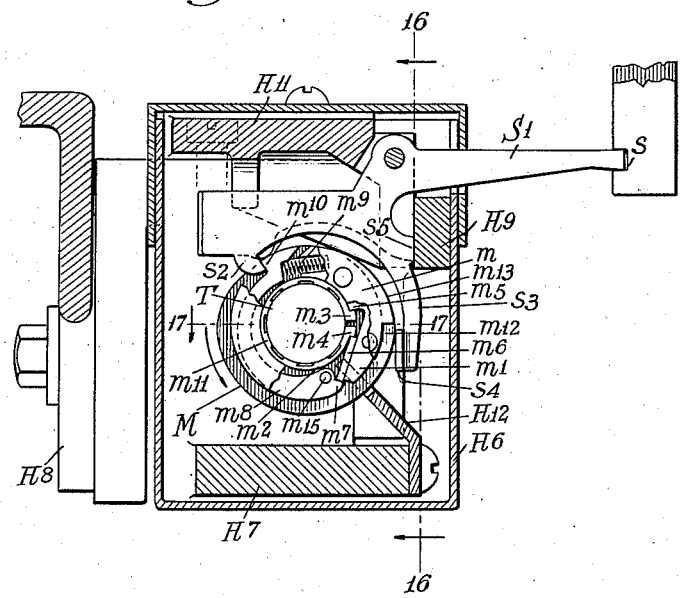
Fig. 15 is a vertical sectional view through the cam and clutch assembly illustrating its construction.

Before the cam unit completes its rotation, which, incidentally, is in the direction of the arrow shown in Fig. 15, the clutch control lever $S^1$ is restored to its normal position by the upward movement of its associated bar $Q^2$ or $R^2$ under the tension of the connected spring $R^5$ in the manner previously described. Consequently, as the cam completes its rotation, the projection $s^2$ on the lever $S^1$ will be located in a position to intercept the shoulder $m^{10}$ on the clutch lever $m^8$. As the shoulder $m^{10}$ banks against the projection $s^2$, the lever $m^8$ ceases to act as such so that the only force exerted upon the shoulders of the band $m^2$ will be that due to the direct force exerted by the spring through the arcuate member $m^1$. This force is small and while it does create a slight drag between the band and the shaft T, it is not sufficient in any way to hinder the rotation of said shaft relative to the cam when the latter is in its normal position of rest. The band $m^2$ itself has resilient qualities, tending always to expand out of gripping relation with the driving roller, and is formed with a series of shallow grooves between spaced projections $m^{11}$. This construction acts to break down the oil film between the band and the shaft T so that the engaging surface presented by the projections $m^{11}$ will have greater frictional contact with the shaft. It has been found that the band $m^2$ may be made of a good grade of cast iron with satisfactory results.

The clutch control lever $S^1$ is formed with a depending arm $s^3$ terminating in a laterally projecting flange $s^4$ (Fig. 17) located at the rear of the cam and in alinement with the plate $m$. When the cam M is located in its normal position, the plate $m$ in that portion thereof opposite the flange $s^4$ presents a recessed portion $m^{12}$ so as not to interfere with the operation or tripping of the clutch by the lever $S^1$. However, as the cam nears the completion of its rotation, a high portion $m^{13}$ on the plate $m$ will engage the flange $s^4$ on the depending arm of the lever $S^1$, causing the latter to be moved positively to its normal position and thus effect the release of the clutch. The normal position of the clutch control lever $S^1$ is determined by a transverse bar $H^9$ located at the rear of the cam assembly housing and extending from one end thereof to the other. This bar furnishes an abutment against which a surface $s^5$ on the lever $S^1$ banks when the latter is in its normal position.

It might also be mentioned here that the bar $H^9$ also serves to determine the normal position of the levers $M^3$ which operate the trains of connections for conditioning the auxiliary reed sections and for actuating the main reed sections from the cams M and N. For this purpose, these levers are likewise formed with surfaces $m^{14}$ (Figs. 10 and 18) adapted to engage the bar $H^9$ when said levers are in their normal positions.

As previously pointed out, the bars $Q^2$, $R^2$ (which actuate the clutch control levers) and the bars $M^1$, $N^1$ (which in turn are actuated by the cams) are arranged in pairs. Consequently the levers $S^1$ and $M^3$, which are operated thereby, are likewise arranged in pairs (see Fig. 16). These levers $S^1$ and $M^3$ are held in a fixed position laterally by slots $H^{10}$ machined in a transverse casting $H^{11}$ fastened at the top of the casting $H^2$ supporting the cam assembly. The cam units M and N are likewise held in a fixed position laterally so as properly to cooperate with the levers $S^1$, $M^3$ by a slotted angularly shaped comb plate $H^{12}$ screwed to a lower cross member of the cam assembly supporting casting $H^7$.

Figure 18:
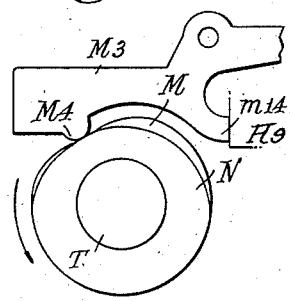
Fig. 18 is a view illustrating the difference in the configuration between the cams controlling the actuation of the sets of main reed sections and the conditioning of the groups of auxiliary reed sections.

At this point, attention is called to the fact that it is desirable for proper operation that the groups of auxiliary reed sections be conditioned somewhat in advance of the actuation of the main reed sections and also that the latter be restored to normal position before the restoration of the auxiliary reed sections to their normal positions. In order to effect this result, the cams M that effect the conditioning of the auxiliary reed sections are shaped somewhat differently from those effecting the actuation of the main reed sections. The difference in configuration is illustrated in Fig. 18. Here, it will be observed that the rise in the cams M, controlling the conditioning of the auxiliary reed sections, occurs in advance of the rise in the cams N that effect the actuation of the main reed sections, and also that the drop in the cams M permitting restoration of the parts to normal position occurs subsequently to the drop in the cams N. In this way, the proper timing for the operation of the parts is effected.

As stated at the outset, the present machine is equipped to handle ninety-character matrix fonts and seventy-two-character matrix fonts which, because of the difference in the size of the matrices, require that the characters in the respective fonts be differently located in the magazines. Furthermore, as a result of this condition, the reed effecting the operation of the escapement for the release of a character from one magazine might be, and for the most part is, differently located from the reed effecting the operation of the escapement for the release of the corresponding character from the other magazine. Mention was also made that, to compensate for this condition, a double set of key bars $P^1$ is provided, with means for shifting one set or the other into position to be controlled by the finger keys depending upon the magazine in operative position. The bars of each set are arranged one alongside of the other with the projections P that are engaged by the key levers $O^1$ located at the same level. The sets of key bars are mounted in the frame $P^2$ (Fig. 6) consisting of side members $p$ and $p^1$ and top and bottom members $p^2$ and $p^3$, the latter two members being those which support the slotted plates $P^3$ and $P^4$ wherein the key bars $P^1$ are guided (Fig. 2). The upper frame member $p^2$ is relatively wide and formed with two spaced bracket-like members $p^4$ and $p^5$ projecting above the frame and terminating in bosses $p^6$ and $p^7$ through which there extends a transverse shaft $p^8$ journalled at its ends in upright members of the machine. One of the bosses, namely, the one at the right, $p^7$, is internally threaded to cooperate with an externally threaded portion $p^9$ of the shaft $p^8$, the arrangement being such that as the bar is rotated in a clockwise direction (looking at the parts from the right in Fig. 6), the frame is shifted to the left, in which position one set of key bars will be under the control of the finger keys, whereas when the shaft is rotated in the opposite or counterclockwise direction, the frame will be shifted to the right, in which position the other set of key bars will be under the control of the finger key. When the frame is in its rightmost position, as shown in Fig. 6, the set of key bars for the release of matrices from a ninety-character font is active; whereas, when the frame is in its left-most position, the set of key bars for the release of matrices from a seventy-two-character font is active. To be more specific, because of the difference in location of the characters in the respective magazines, the release of a given character from the ninety-character font will require the operation of one reed, whereas the release of the same character from the seventy-two character font will require the operation of a different reed. The double set of key bars permits the finger key, which is the same in each instance, to be connected for the operation of one reed or the other as required. As shown in Fig. 13, a key bar $P^1$ of one set operated by a given finger key is connected with one pair of bails from the groups Q and R, whereas the corresponding key bar of the other set operated by the same finger key is connected with a different pair of bails from said groups. The reed controlled by the finger key will, of course, depend upon the pair of bails actuated by the key bars.

The shifting of the key bar frame $P^2$ from one position to another is effected automatically as the frame $B^2$, on which the entrance throats B and $B^1$ are mounted, is rotated to bring the proper entrance throat into operative position for the magazine in use (see Fig. 1). For this purpose, the shaft $p^8$ is provided at its right end with a crank $p^{10}$ operated by a relatively long arm $p^{11}$ fixed to one end of a short shaft $p^{12}$ journalled in a bracket $H^{13}$ secured to the machine frame. At the other end of the shaft $p^{12}$, there is secured a bifurcated or U-shaped member $p^{13}$, adapted to be oscillated back and forth to move the arm $p^{11}$ in a manner to locate the crank $p^{10}$ in its different operative positions. It will be observed that the crank $p^{10}$ is connected to the arm $p^{11}$ by a pin and slot connection $p^{14}$ to provide for the relative movement between the parts at this point.

The oscillation of the bifurcated member $p^{13}$ is effected by a star wheel $p^{15}$ (see Figs. 1, 11 and 12) rotatably mounted on a shaft $p^{16}$ journalled at its opposite ends in the supporting bracket $H^{13}$ which has two spaced arms for the purpose. The star wheel is formed with alternating high portions and low portions, the arrangement being such that when a high portion engages one arm of the bifurcated member, a low portion engages the other, and vice versa. The star wheel is rotated through the medium of a pawl $p^{17}$ and ratchet wheel $p^{18}$, the ratchet wheel being fixed to the star wheel, and the pawl being mounted at the end of a short crank arm $p^{19}$ fixed on the shaft $p^{16}$. The shaft $p^{16}$ has secured to it, at its opposite end, a long operating arm $p^{20}$ extending upwardly and connected at the top by a pin and slot connection $p^{21}$ to the fore-and-aft slide C which controls the shifting of the magazine entrances as previously alluded to (see Fig. 1). Assuming now that a high portion of the star wheel $p^{15}$ is opposite the front arm of the bifurcated member $p^{13}$ and a low portion thereof opposite the rear arm of the bifurcated member, it will be apparent that as the fore-and-aft slide C is moved forwardly, the long arm $p^{20}$ will be turned from the solid line position shown in Fig. 1 to the dotted line position shown therein, with the result that the pawl $p^{17}$ will move the ratchet wheel $p^{18}$ through the distance of one tooth so as to bring a low portion of the star wheel $p^{15}$ opposite the front arm of the bifurcated member and a high portion thereof opposite the rear arm of said member. This movement of the bifurcated member will turn the crank $p^{10}$ to the dotted line position shown in Fig. 1 and will have the effect of shifting the key bar frame $P^2$ to the left. Since a forward and rearward movement of the fore-and-aft slide C is required for the substitution of one magazine entrance for the other, the rearward movement of the slide will be inoperative insofar as the operation of the star wheel is concerned, the pawl during the rearward movement of the arm $p^{20}$, occasioned by the return stroke of the slide C, merely sliding over the teeth of the ratchet wheel. The next forward movement of the fore-and-aft slide C, which occurs when the next substitution of a magazine entrance is made, will again rotate the star wheel $p^{15}$ to bring a high portion thereof opposite the forward arm of the bifurcated member $p^{13}$ and a low portion thereof opposite the rear arm of said member, with the result that the key bar frame will be returned to its position at the right. From the foregoing, it will be seen that, as long as the proper magazine entrance is in position to cooperate with the magazine in use, the proper set of key bars for releasing the matrices from such magazine will be connected with the finger keys.

In the chart shown in Fig. 20, there is diagrammatically illustrated the connections between the key bars $P^1$ and the groups of bails which are active in the selection of the proper cams of the respective groups M and N. The horizontal lines opposite the letter V represent the group of bails that effect the selection of the cams M controlling the conditioning of the auxiliary reed section groups; whereas the horizontal lines opposite the letter W represent the bails that effect the selection of the cams controlling the operation of the sets of main reed sections. The vertical lines represent the double key bars. The large circles indicate the connections between the bails and the key bars of the set that is active in the release of matrices from the ninety-character fonts; whereas the smaller circles indicate the connections between the bails and the key bars of the set that is active in the release of matrices from the seventy-two-character font.

Referring to the top portion of the chart, namely, the portion opposite the letter U, it will be observed that the first group of reed sections (the number of the groups being indicated by the numbers in the boxes at the top) controls the release of ten characters from the ninety-character font, namely, *e, t, a, o, i, n, s, h, r,* and *d.* Since these letters are all in the first group, the conditioning of the first group of auxiliary reed sections will be required for the release of each of them. Since the first bail opposite the letter V is the one active in conditioning the first group of auxiliary reed sections, the first ten key bars corresponding to these letters will be connected to this bail. These connections are shown by the large circles which, as previously stated, indicate the connections for the ninety-character font.

Also as shown at the top of the chart opposite the letter U, since the ten charcters referred to are released by reeds in the same group, the main sections of said reeds are connected each to a different main reed section operating bail. Consequently, opposite the letter W, which illustrates the connections of the key bars with the bails controlling the actuation of the main reed sections, the first ten key bars corresponding to said characters are shown connected each to a different bail by a large circle. In tracing the connections from the chart, it will be helpful to remember that the bails opposite the letter V and the groups of auxiliary reed sections conditioned thereby are correspondingly numbered, and that the bails opposite the letter W and the bails opposite the letter U which are controlled thereby are likewise correspondingly numbered.

With regard to a seventy-two-character font, the first ten letters are the same as in the ninety-character font, but, due to the difference in the size of the matrices (see Fig. 7), only the letters e, t, a, o, i, n, and s are released by the operation of reeds in the first group, the letters h, r, and d being released by the operation of reeds in the second group (see the upper part of the chart in Fig. 20). This being the case, when a seventy-two-character font is being used, the release of the characters e, t, a, o, i, n and s will require the conditioning of the first group of auxiliary reed sections, whereas the release of the characters h, r and d will require the conditioning of the second group of auxiliary reed sections. Accordingly, as shown in the chart opposite the letter V, only the first seven key bars (corresponding to the characters e, t, a, o, i, n and s) of the set used with the seventy-two-character font will be connected to the first bail of this group, whereas the key bars corresponding to the characters h, r and d will be connected to the second bail of the group. These connections are indicated by the small circles.

Again referring to the upper part of the chart opposite the letter U, it will be observed that, as regards the seventy-two-character font, the character e is released by the operation of the top or first bail controlling the actuation of the main reed sections, the letter t by the third bail, the letter a by the fourth bail, the letter o by the sixth bail, the letter i by the seventh bail, the letter n by the eighth bail, and the letter s by the ninth bail. It will also be observed that the letters h, r and d, which are in the second group, are released by the operation of the first, second and third bails, respectively. In the lower part of the chart opposite the letter W, the key bars for the letters e, t, a, o, i, n, s, h, r, d are shown connected to the correspondingly numbered bails as indicated by the small circles. In other words, and with regard to both the ninety and the seventy-two-character fonts, depending upon the number of the group in which the characters appear at the top of the chart, the key bars active in the release of such characters will be connected respectively to the correspondingly numbered bails in the group opposite the letter V, and likewise, depending upon the number of the bail active in the operation of the main reed sections corresponding to a given character as indicated opposite the letter U, the key bar for the release of such character will be connected to the same numbered bail in the group opposite the letter W which, as previously stated, indicates the bails controlling the operation of the cams actuating the bails connected with the main reed sections. With the foregoing few illustrations, it is thought the chart in Fig. 20 is sufficiently self-explanatory to enable the connections between the finger keys and escapements for the release of all the characters to be traced without further description.

As previously stated, the respective key bars $P^1$ of the two sets are arranged one alongside of the other and, as shown in Fig. 14, are actually guided in the same slots in the cross plates $P^3$ and $P^4$. In order to eliminate as much friction as possible, so as to prevent the operation of a key bar of one set when the corresponding key bar of the other set is operated, the body portions of the key bars of one set are offset slightly so that, except at the top and bottom where the key bars enter the guiding slots, said key bars are out of contact one with the other.

In several instances, as shown in Fig. 20, the key bars of one set are connected to the same pair of bails as the key bars of the other set. In such cases, if desired, only one key bar need be used. However, if this is done, the forwardly projecting portion P thereof which is engaged by the key lever $O^1$ would have to be sufficiently wide to accommodate the lateral shift of the key bar frame. Such a key bar with its wider projection is shown in Fig. 6 at $p^{22}$ for use in the release of the character "e".

The spacebands in the present machine are released through the operation of a cam and clutch device similar to those employed in the release of the matrices, except that only one of such cam and clutch assemblies is necessary. The spaceband releasing cam X is located at the extreme left of the cam group M (Fig. 6) and is controlled through the customary spaceband lever $X^1$ pivotally mounted near its center (see Fig. 2), and which cooperates at its rear end with a key bar $X^2$ similar to those active in releasing the regular characters, except that it has an extra wide projection $X^3$ where it is engaged by the spaceband lever to accommodate the lateral movement of the shift frame $P^2$. The spaceband key bar at its upper end is connected with a bail $X^4$ (see Fig. 3) pivotally mounted on the pin that supports the topmost bail of the group Q associated with the key bars $P^1$ and which is active in conditioning the auxiliary reed sections. This bail, however, as shown in Fig. 3, is of narrow width and individual to the spaceband key bar, so that its operation will have no effect upon any of the character releasing mechanisms. This bail controls the operation of the associated cam clutch through the medium of a bar $X^5$ similar to those performing the same function in connection with the release of the character matrices. This cam in turn operates a long vertical bar $X^6$ through which the spacebands are released from the spaceband magazine (not shown).

Figure 19:
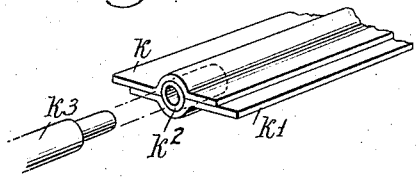
Fig. 19 is a perspective view showing the individual bail construction.

The actual construction of the individual bails is shown in Fig. 19. Here it will be observed that the bails each include two superposed plates $k$ and $k^1$ slightly offset laterally one from the other and curved outwardly in opposite directions at the center so as to accommodate a ferrule $k^2$ which fits the reduced portion of pins $k^3$ which give the bails their pivotal support. Bails of this construction, while being relatively thin at their edges, actually have ample strength near their centers because of the double layer of metal provided. The two plates may be spot welded or otherwise suitably secured together.

In the accompanying drawings, the invention has been shown merely in preferred form and by way of example, but obviously many changes and variations may be made therein without departing from its spirit. For instance the keyboard mechanism is such that for the "Linotype" keyboard layout, there could be substituted a keyboard wherein the keys are arranged in accordance with the standard typewriter keyboard layout. To do this, in addition to a substituted keyboard proper, it would be necessary only to substitute a different key bar frame wherein the key bars would be connected to those bails of the groups Q and R that release the characters corresponding to keys in the substituted keyboard and which operate the respective key bars. In other words, with the improved keyboard mechanism, any desired keyboard layout could be used merely by substituting a key bar frame, wherein the key bars corresponding to the characters on the keyboard are in turn connected to the pair of bails Q, R, that release the matrices bearing corresponding characters from the magazine.

Actually, to make the switch to the typewriter keyboard it would not be necessary to change the keyboard proper if the keys thereof were provided with dual markings or the key buttons themselves replaced or capped. Then too, if the machine were equipped to handle say only ninety-character fonts, a key bar frame could be equipped with two sets of key bars, one for use with the "Linotype" keyboard layout, and the other for use with the typewriter keyboard layout. If then the keys are provided with duel markings, the shift from one keyboard layout to the other could be made merely by shifting the key bar frame in the same manner as that described for changing over from a ninety-character font to a seventy-two-character font or vice versa. It is to be understood, therefore, that the invention is not limited to any specific form or embodiment, except insofar as such limitations are specified in the appended claims.

Having thus described my invention, what I claim is:

1. In or for a typographical composing machine adapted to be equipped with a channeled matrix magazine having escapement devices for releasing the matrices from the magazine for composition in line under the control of a keyboard, an escapement operating mechanism including, in combination, a plurality of groups of main reed sections, a corresponding plurality of groups of auxiliary reed sections, there being an auxiliary reed section for each main reed section, the auxiliary reed sections normally being out of operative relation with the main reed sections but adapted upon conditioning to be operated by said main reed sections and in turn to operate the escapement devices, a group of power operated trains of connections arranged each to operate a different set of main reed sections, each said set comprising a reed section from each of the different groups, another group of power operated trains of connections arranged each to condition a different group of auxiliary reed sections for operation by the main reed sections, and key-controlled means for selectively operating simultaneously two trains of connections, one from each group, whereby that escapement device is operated which corresponds to the actuated main reed section in the group corresponding to the conditioned group of auxiliary reed sections.

2. Escapement operating mechanism according to claim 1, wherein the main reed sections are grouped so as to contain the same number of operable reed sections in each group, with an additional group if necessary to contain the excess reed sections insufficient in number to make a full group.

3. Escapement operating mechanism according to claim 1, wherein the main reed sections are grouped so as to contain the same number of operable reed sections in each group, with an additional group if necessary to contain the excess reed sections insufficient in number to make a full group, and wherein the number of groups of reed sections is within the range of one plus and minus the number of individual reed sections in a full group.

4. Escapement operating mechanism according to claim 1, wherein the main reed sections are grouped so as to contain the same number of operable reed sections in each group, with an additional group if necessary to contain the excess reed sections insufficient in number to make a full group, and wherein each set of main reed sections operable by a given train of connections includes corresponding individual reed sections from the respective groups.

5. Escapement operating mechanism according to claim 1, wherein the group of trains of connections for operating the sets of main reed sections includes a group of bails operatively connected each to the reed sections of a different set.

6. Escapement operating mechanism according to claim 1, wherein the group of trains of connections for conditioning the groups of auxiliary reed sections includes a group of bails operatively connected each to a different one of said groups of auxiliary reed sections.

7. Escapement operating mechanism according to claim 1, wherein each group of auxiliary reed sections is mounted in a movable frame above its corresponding group of main reed sections and located normally so that the reed sections therein are out of operative alinement with the reed sections in said main reed section group, and wherein the train of connections for conditioning each group of auxiliary reed sections includes devices adapted when operated to move said group of auxiliary reed sections into operative alinement with the reed sections of said main reed section group so as to be operable thereby.

8. Escapement operating mechanism according to claim 1, wherein the two groups of trains of connections are actuated from two corresponding groups of power-operated cam devices, there being one cam device for each train of connections in the respective groups.

9. Escapement operating mechanism according to claim 1, wherein the two groups of trains of connections are actuated from two corresponding groups of power-operated cam devices, there being one cam device for each train of connections in the respective groups, and wherein the key-controlled means for simultaneously operating a train of connections from each group includes instrumentalities for selecting a cam device from each group for conjoint operation.

10. Escapement operating mechanism according to claim 1, wherein the key-controlled means for simultaneously operating a train of connections from each group includes a group of elements for each such group, there being one element in each group for each train of connections in the corresponding group, and said elements adapted upon actuation to control the operation of their corresponding trains of connections.

11. Escapement operating mechanism according to claim 1, wherein the key-controlled means for simultaneously operating a train of connections from each group includes two groups of bails, one group for each group of trains of connections, there being a bail in each group for each train of connections in the corresponding group, and said bails being arranged upon actuation to control the operation of their corresponding trains of connections.

12. Escapement operating mechanism according to claim 1, wherein each group of trains of connections is actuated from a corresponding group of power-operated cam devices, one cam device being provided for each train of connections in the respective groups, and wherein the key-controlled means for simultaneously operating a train of connections from each group includes two groups of bails, one group for each group of power-operated cam devices, said bails being operative each to control the operation of a different cam device in the corresponding group, and the keys being arranged to operate each a different pair of bails selected one from each group.

13. Escapement operating mechanism according to claim 1, wherein each group of trains of connections is actuated from a corresponding group of power-operated cam devices, one cam device being provided for each train of connections in the respective groups, and wherein the key-controlled means for simultaneously operating a train of connections from each group includes two groups of bails, one group for each group of power-operated cam devices, said bails being operative each to control the operation of a different cam device in the corresponding group, and key-operated bars operatively connected each to a different pair of bails selected one from each group.

14. In or for a typographical composing machine adapted to be equipped with two superposed channeled magazines containing matrices occupying differently located channels according to character and provided with escapement devices for releasing matrices from the respective magazines as desired, escapement operating mechanism including, in combination, a plurality of groups of main reed sections, a corresponding plurality of groups of auxiliary reed sections, there being an auxiliary reed section for each main reed section, the auxiliary reed sections normally being out of operative relation with the main reed sections but adapted upon conditioning to be operated by said main reed sections and in turn to operate the escapement devices, a group of power-operated trains of connections arranged each to operate a different set of main reed sections, each said set comprising a reed section from each of the different groups, another group of power-operated trains of connections arranged each to condition a different group of auxiliary reed sections for operation by the main reed sections, key-controlled means for selectively operating simultaneously one or another pair of trains of connections, i. e. one train from each group, depending upon the magazine in use to release a matrix of a given character, and means whereby the particular key corresponding to said character can be connected for the selection of either of said pairs of trains of connections.

15. Escapement operating mechanism according to claim 14, wherein the means for connecting the keys for the selection of the different pairs of trains of connections includes a double set of key bars, and means for rendering one or the other thereof operative depending on the magazine in use.

16. Escapement operating mechanism according to claim 14, wherein the means for connecting the keys for the selection of the different pairs of trains of connections includes a group of bails for each group of trains of connections, with a bail in each group for each train of connections in the corresponding group, a double set of key bars connected to different pairs of bails, and means for connecting the keys with one set of key bars or the other depending upon the magazine in use.

17. In a keyboard mechanism, the combination of a plurality of groups of main reed sections, a corresponding plurality of groups of auxiliary reed sections, there being an auxiliary reed section for each main reed section, the auxiliary reed sections normally being out of operative relation with the main reed sections but adapted upon conditioning to be operated by said main reed sections and in turn to operate the instrumentalities under the control of the keyboard, a group of power-operated trains of connections arranged each to operate a different set of main reed sections, each said set comprising a reed section from each of the different groups, another group of power-operated trains of connections arranged each to condition a different group of auxiliary reed sections for operation by the main reed sections, and means for selectively operating simultaneously two trains of connections, one from each group, whereby that instrumentality is operated which corresponds to the actuated main reed section in the group corresponding to the conditioned group of auxiliary reed sections.

18. In a keyboard mechanism, the combination of a plurality of groups of main reed sections, a corresponding plurality of groups of auxiliary reed sections, there being an auxiliary reed section for each main reed section, the auxiliary reed sections normally being out of operative relation with the main reed sections but adapted upon conditioning to be operated by said main reed sections and in turn to operate the instrumentalities under the control of the keyboard, a series of finger keys, and two trains of connections adapted to be actuated by each finger key, one train being arranged to operate a selected set of main reed sections comprising a reed section from each of the different groups, and the other train being arranged to condition a selected group of auxiliary reed sections, whereby that instrumentality is operated which corresponds to the actuated main reed section in the group corresponding to the conditioned group of auxiliary reed sections.

19. In a keyboard mechanism, the combination of a rotary driving element, a rotary driven element mounted concentrically thereon in normally disconnected relation but capable of connection therewith, an expansible and contractable friction device carried by the driven element, means acting through said friction device to effect a driving connection between the driving element and the driven element, and means for controlling the making and breaking of said driving connection.

20. In a keyboard mechanism, the combination of a rotary driving element, a rotary driven element mounted thereon in normally disconnected relation but capable of connection therewith, a friction band carried by the driven element and encircling the driving element, means for causing the friction band to grip the driven element to effect a driving connection between said elements, and means for controlling the making and breaking of said driving connection.

21. In a keyboard mechanism, the combination of a rotary driving element, a rotary driven element mounted thereon in normally disconnected relation but capable of connection therewith, a friction device carried by the driven element, means including a spring actuated lever normally held inoperative but adapted when released to effect through said friction device a driving connection between the driving element and the driven element, and means for releasing said lever and later restoring it to normal position.

22. In a keyboard mechanism, the combination of a rotary driving element, a rotary driven element mounted thereon but normally disconnected therefrom, a split friction band carried by the driven element and encircling the driving element, said friction band having one end thereof fixed with respect to the driven element, a spring actuated lever pivotally mounted on said driven element, an interponent between said lever and the other end of the friction band, said lever being normally held inoperative but adapted when released to act through said interponent to cause the friction band to grip the driving element whereby to effect a driving connection between said element and the driven element, and means for releasing said lever and later restoring it to normal position.

23. In a keyboard mechanism, the combination of a power-driven roll, a cam device mounted thereon but normally disconnected therefrom, a friction element carried by the cam device and encircling the power-driven roll, a spring actuated lever pivotally mounted on said cam device for effecting through said friction element a driving connection between the driving element and the driven element, and a key-actuated trip lever for rendering the spring actuated lever operative.

24. In a keyboard mechanism, the combination of a power-driven roll, a cam device mounted thereon but normally disconnected therefrom, a friction element carried by the cam device and encircling the power-driven roll, a spring actuated lever pivotally mounted on said cam device for effecting through said friction element a driving connection between the driving element and the driven element, and a key-actuated trip lever for rendering the spring actuated lever operative, said trip lever acting to restore the spring actuated lever to normal position at the completion of one revolution of the cam.

25. In a keyboard mechanism, the combination of a power-driven roll, a cam device mounted thereon but normally disconnected therefrom, a friction element carried by the cam device and encircling the power-driven roll, a spring actuated lever pivotally mounted on said cam device for effecting through said friction element a driving connection between the driving element and the driven element, a key-actuated trip lever for rendering the spring actuated lever operative, and means for restoring the trip lever to normal position wherein through engagement with the spring actuated lever it will effect the breaking of the driving connection.

26. A typographical composing machine including, in combination, two superposed channeled magazines provided with escapements and containing matrices occupying differently located channels according to character, means controlling the distribution of matrices to the respective magazines and being adjustable depending upon the magazine in use, means including two sets of elements adapted when in operative position one, to actuate the escapements associated with one magazine and the other to actuate the escapements associated with the other magazine, and means for automatically rendering the proper set of elements operative as the adjustment is made for a given magazine of the means for controlling the distribution of matrices thereto.

27. A typographical composing machine including, in combination, two superposed channeled magazines provided with escapements and containing matrices occupying differently located channels according to character, two magazine entrances adjustable each into operative position depending upon the magazine in use, means including two sets of elements adapted when in operative position one, to actuate the escapements associated with one magazine and the other to actuate the escapements associated with the other magazine, and means for automatically rendering the proper set of elements operative upon the adjustment of the corresponding magazine entrance into operative position.

28. A typographical composing machine including, in combination, two superposed channeled magazines provided with escapements and containing matrices occupying differently located channels according to character, two magazine entrances adjustable each into operative position depending upon the magazine in use, means including two sets of elements located in a frame and adapted when operative, one set to actuate the escapements associated with one magazine, and the other set to actuate the escapements associated with the other magazine, and means for automatically shifting said frame to render the proper set of elements operative upon the adjustment of the corresponding magazine entrance into operative position.

JAMES C. PLASTARAS.